(12) United States Patent
Chen et al.

(10) Patent No.: US 11,952,044 B2
(45) Date of Patent: Apr. 9, 2024

(54) ALL-TERRAIN VEHICLE

(71) Applicant: KWANG YANG MOTOR CO., LTD., Kaohsiung (TW)

(72) Inventors: Te-Feng Chen, Kaohsiung (TW); Guei-Cheng Ye, Kaohsiung (TW); Shih-Bin Chien, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 396 days.

(21) Appl. No.: 17/344,974

(22) Filed: Jun. 11, 2021

(65) Prior Publication Data
US 2022/0041223 A1 Feb. 10, 2022

(30) Foreign Application Priority Data

Aug. 7, 2020 (TW) ................................ 109210242

(51) Int. Cl.
| | |
|---|---|
| *B62D 25/08* | (2006.01) |
| *B60K 11/02* | (2006.01) |
| *B60Q 1/00* | (2006.01) |
| *B60Q 1/04* | (2006.01) |
| *B60R 11/00* | (2006.01) |

(52) U.S. Cl.
CPC .............. *B62D 25/08* (2013.01); *B60K 11/02* (2013.01); *B60Q 1/0023* (2013.01); *B60Q 1/04* (2013.01); *B60R 11/00* (2013.01); *B60R 2011/004* (2013.01); *B60R 2011/0049* (2013.01)

(58) Field of Classification Search
CPC .... B62D 25/08; B62D 25/082; B62D 25/085; B62D 25/00; B62D 21/183; B62D 21/18; B62D 37/00; B62D 37/06; B60K 11/00; B60K 11/02; B60K 11/04; B60Q 1/0023; B60Q 1/04; B60Q 1/0017; B60Q 1/00; B60Y 2200/124; B60Y 2200/12; B60R 11/00; B60R 11/0264; B60R 2011/004; B60R 2011/0049
See application file for complete search history.

(56) References Cited

U.S. PATENT DOCUMENTS

| | | | |
|---|---|---|---|
| 6,796,404 B1 * | 9/2004 | Dick, Jr. ................. | B60T 8/171 74/606 R |
| 7,143,853 B1 * | 12/2006 | Mercier ............... | B62D 61/065 303/9.62 |

(Continued)

*Primary Examiner* — James M Dolak
(74) *Attorney, Agent, or Firm* — Leong C. Lei

(57) ABSTRACT

An all-terrain vehicle is provided. The all-terrain vehicle includes a vehicle frame unit. A steering mechanism is rotatably mounted to a front side of the vehicle frame unit. Front wheels are rotatable mounted to a lower side of the steering mechanism as being arranged pairwise as a left-side one and a right-side one and are controllable by the steering mechanism. The all-terrain vehicle includes a vehicle cover unit covering a periphery of the vehicle frame unit. The vehicle cover unit includes a front vehicle cover section. An open receiving space is formed between a top side of the front wheels and the front vehicle cover section. An inertial sensor is arranged in the open receiving space. As such, mounting and servicing the inertial sensor can be carried out without removing the front vehicle cover section or other parts, and thus, mounting and servicing of the inertial sensor is made easy.

6 Claims, 4 Drawing Sheets

(56) References Cited

U.S. PATENT DOCUMENTS

| | | | | |
|---|---|---|---|---|
| 7,389,592 B2* | 6/2008 | Tsuruta | ............... | G01C 9/18 |
| | | | | 33/355 R |
| 7,416,044 B2* | 8/2008 | Tsuruta | ............... | B60W 30/192 |
| | | | | 340/440 |
| 7,426,788 B2* | 9/2008 | Hasegawa | ............... | B62K 5/01 |
| | | | | 33/366.24 |
| 7,523,801 B2* | 4/2009 | Kawashima | ............... | B62K 11/00 |
| | | | | 180/219 |
| 7,882,923 B2* | 2/2011 | Yamamoto | ............... | B62K 5/01 |
| | | | | 180/282 |
| 8,086,382 B2* | 12/2011 | Dagenais | ............... | B60T 8/1706 |
| | | | | 701/79 |
| 8,205,707 B2* | 6/2012 | Yamamoto | ............... | B62J 45/415 |
| | | | | 180/283 |
| 8,260,535 B2* | 9/2012 | Dagenais | ............... | B60T 8/1755 |
| | | | | 701/72 |
| 8,378,803 B1* | 2/2013 | Keiser | ............... | B62J 27/00 |
| | | | | 340/459 |
| 8,561,749 B2* | 10/2013 | Person | ............... | B60K 17/16 |
| | | | | 73/494 |
| 9,550,418 B1* | 1/2017 | Logan | ............... | B60L 15/10 |
| 9,889,736 B2* | 2/2018 | Yamada | ............... | F01N 13/008 |
| 10,138,819 B2* | 11/2018 | Matsuda | ............... | F02D 9/08 |
| 11,766,929 B1* | 9/2023 | Decuzzi | ............... | B60K 17/043 |
| | | | | 180/216 |
| 2006/0022812 A1* | 2/2006 | Lang | ............... | B60Q 1/52 |
| | | | | 340/440 |
| 2016/0075404 A1* | 3/2016 | Haaf | ............... | B60W 10/06 |
| | | | | 701/37 |
| 2016/0325739 A1* | 11/2016 | Litz | ............... | G05D 1/0891 |
| 2020/0182124 A1* | 6/2020 | Massie | ............... | F21S 45/48 |

* cited by examiner

ALL-TERRAIN VEHICLE

TECHNICAL FIELD OF THE INVENTION

The present invention relates to an all-terrain vehicle, and more particularly to an all-terrain vehicle that features capability of detecting data in respect of a tilt angle of and angular momentum the all-terrain vehicle in turning so as to enhance driving safety of the all-terrain vehicle and also eases engineering in respect of installation and service for the inertia sensor.

DESCRIPTION OF THE PRIOR ART

An all-terrain vehicle is provided as a vehicle for driving on rough and rugged terrains. When an all-terrain vehicle undergoes a driving operation of passing a turn on a rough terrain, detection is made for a tilt angle and angular momentum of the all-terrain vehicle in passing a turn and the data of the detected tilt angle and angular momentum to a controller of an anti-lock braking system (ABS) for accurately control of the vehicle operation conditions, in order to enhance safety of operation and driving of the all-terrain vehicle. Thus, it is a challenge for the all-terrain vehicle manufacturers to realize installation of an inertia sensor on an all-terrain vehicle to detect data in respect of tilt angle and angular momentum of the all-terrain vehicle in passing a turn and to make instantaneous transmission to a vehicle central controller and an anti-lock braking system for accurate control of the vehicle operation conditions, for the purposes of enhancing safety of operation and driving of the all-terrain vehicle.

SUMMARY OF THE INVENTION

The primary objective of the present invention is to provide an all-terrain vehicle that mainly overcomes the drawback of a prior art all-terrain vehicle that is incapable of detecting data concerning tilt angle and angular momentum of the all-terrain vehicle in passing a turn for the purposes of enhancing operation controllability of the all-terrain vehicle.

For such a purpose, the primary technical solution according to the present invention is to provide an all-terrain vehicle, wherein the all-terrain vehicle at least comprises a vehicle frame unit, a steering mechanism being rotatably mounted to a front side of the vehicle frame unit, front wheels being rotatably mounted to a lower side of the steering mechanism as being arranged pairwise as a left-side one and a right-side one and controllable by the steering mechanism; the all-terrain vehicle further comprises a vehicle cover unit covering a periphery of the vehicle frame unit, the vehicle cover unit at least comprising a front vehicle cover section, and is characterized an open receiving space is formed between a top side of the front wheels and the front vehicle cover section, and an inertial sensor is arranged in the open receiving space.

The efficacy that the present invention may achieve with the primary technical solution is that or engineering of mounting and servicing the inertial sensor, the engineering of mounting and servicing can be carried out without removing the front vehicle cover section or other parts, and thus the engineering of mounting and servicing of the inertial sensor is made easy.

DETAILED DESCRIPTION OF THE PREFERRED EMBODIMENT

For better understanding of the structure of the present: invention, and the advantages achieved thereby, a description will be provided below with reference to the attached drawings.

Figure 1:
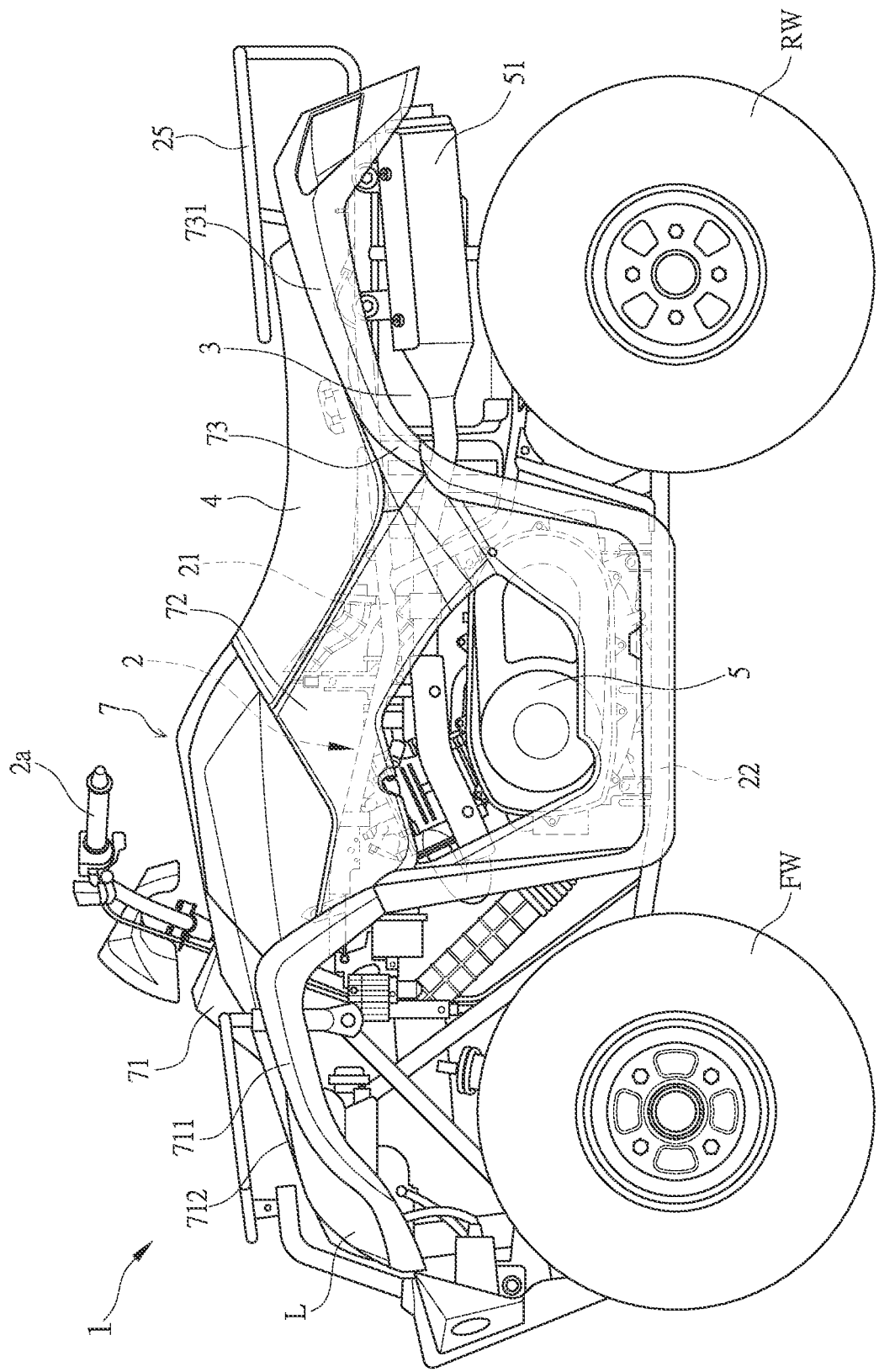
FIG. 1 is a side-elevational view showing an all-terrain vehicle according to the present invention.
Figure 2:
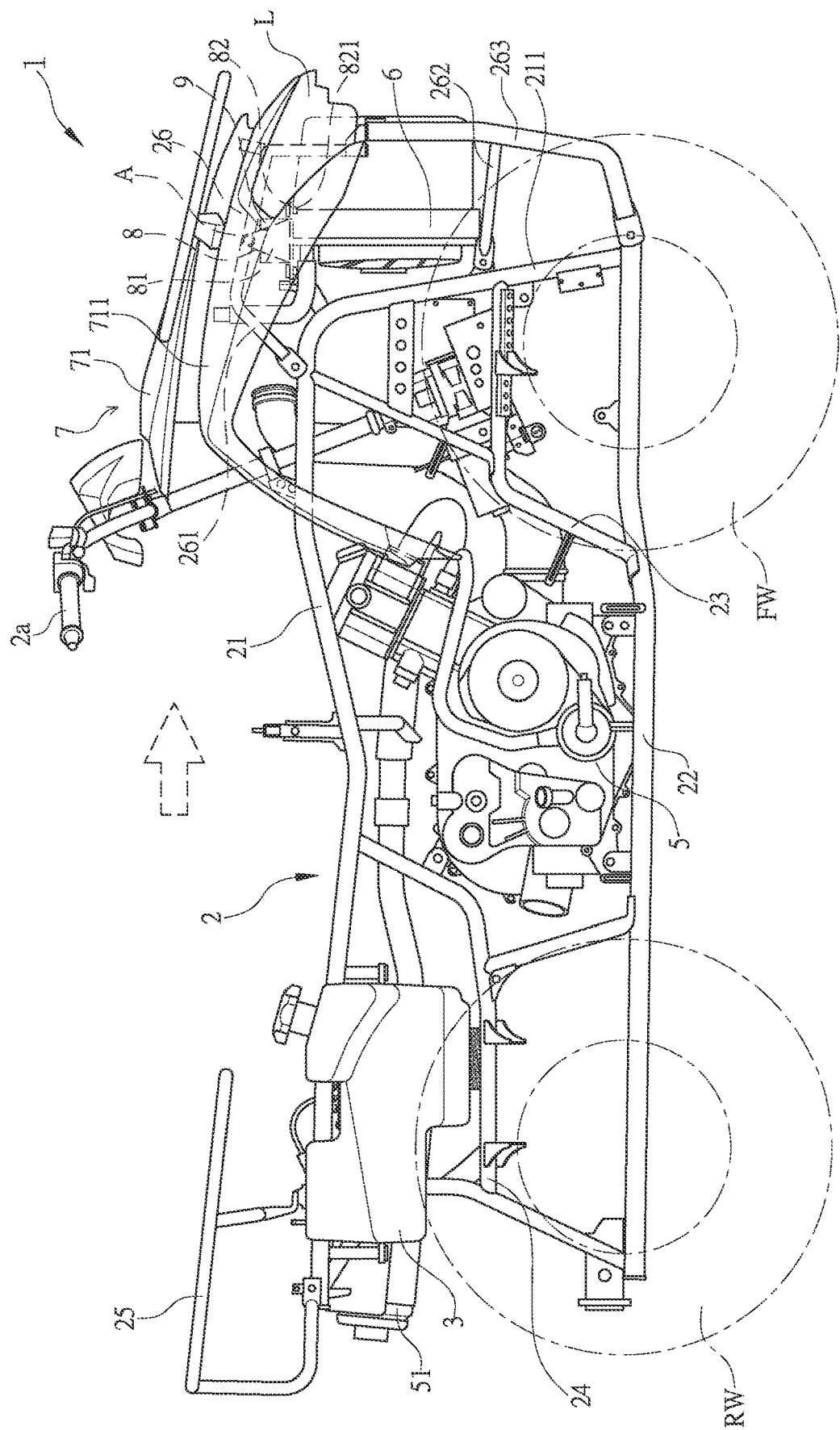
FIG. 2 is a side elevational view showing the all-terrain vehicle according to the present invention, with a vehicle cover unit being removed.

Firstly, referring to FIGS. 1 and 2, the present invention provides an all-terrain vehicle. The all-terrain vehicle 1 comprises a vehicle frame unit 2, a steering mechanism 2a rotatably mounted to a front part of the vehicle frame unit 2, a pair of front wheels FW that are arranged as a left-side one and a right-side one rotatably mounted to a lower side of the front part of the vehicle frame unit 2 and are controllable by the steering mechanism 2a, a fuel tank 3 that is arranged in a rear part of the vehicle frame unit 2 for storing fuel therein, a seat cushion 4 that is arranged on an upper side of the rear part of the vehicle frame unit 2, a pair of rear wheels RW that are arranged as a left-side one and a right-side one rotatably mounted to a lower side of the rear part of the vehicle frame unit 2, and a power unit 5 that is arranged on the vehicle frame unit 2.

As shown in FIGS. 1 and 2, the vehicle frame unit 2 at least comprises a pair of top side-tubes 21 that are arranged as a left-side one and a right-side one and a pair of bottom side-tubes 22 that are arranged below the top side-tubes 21 in a manner of respectively corresponding thereto, wherein the top side-tubes 21 are each provided with a down tube section 211 toward a vehicle-head direction (the vehicle-head direction being indicated by an arrow provided in the drawings), and a lower end of the down tube section 211 is connected to the bottom side-tubes 22. Further, a front ancillary tube assembly 23 is provided at a front side (meaning toward the vehicle-head direction) of the top side-tubes 21 and the bottom side-tubes 22 at a location therebetween and connected thereto at each of two sides thereof, and the front ancillary tube assembly 23 is arranged in pair at left side and right side. The front ancillary tube assembly 23 is connected to the down tube sections 211, the bottom side-tubes 22, and the top side-tubes 21. A rear ancillary tube assembly 24 is provided at a rear end (vehicle tail) of the vehicle frame unit 2 at a location between the top side-tubes 21 and the bottom side-tubes 22 at two sides thereof. The rear ancillary tube assembly 24 comprises (the left side and the right side respectively referring to the left hand and the right hand of a driver driving the vehicle, this being equally applicable hereinafter) a left ancillary tube and a right ancillary tube. The drawings show only the right ancillary tube. The rear ancillary tube assembly 24 is connected to the top side-tubes 21 and the bottom side-tubes 22. A rear rack 25 is provided at the rear end (vehicle tail) of the vehicle frame unit 2 and located on the top side-tubes 21.

As shown in FIGS. 1 and 2, the steering mechanism 2a is rotatably mounted to the front side of the vehicle frame unit 21, and a group of front wheels FW are mounted to a lower end of the steering mechanism 2a. The front wheels FW are drivable by the steering mechanism 2a to do operation for leftward and rightward turning. The vehicle frame unit 2 is provided with the seat cushion 4 on the top side-tubes 21 and toward the rear side of the vehicle body for receiving a rider to sit thereon. The seat cushion 4 is liftable from the vehicle frame unit 2. The vehicle frame unit 2 is further provided with the power unit 5 between the top side-tubes 21 and the bottom side-tubes 22, and more specifically, the power unit 5 is located below the seat cushion 4. The vehicle frame unit 2 is connected, at a rear end thereof, with a group of rear wheels RW that is drivable by the power unit 5. An exhaust device 51 is extended from the power unit 5 in a direction toward the rear side of the vehicle body for discharging exhaust gas from the power unit 5.

As shown in FIGS. 1, 2, 3, and 4, the vehicle frame unit 2 further comprises a front bracket 26 that is arranged at the front side of the vehicle body, namely located at an upper side of a front end of the top side-tubes 21 and at a front end of the bottom side-tubes 22. The top side-tubes 21 and the bottom side-tubes 22 are arranged pairwise as a left-side one and a right-side one and the drawings show only one side. The front bracket 26 comprises top branch tube 261 of which one end is connected to the top side-tubes 21, a transverse branch tube 262 of which one end is connected to the down tube sections 211 of the top side-tubes 21, and a bottom branch tube 263 of which one end is connected to the bottom side-tubes 22. An end of the top branch tube 261 that is opposite to the connection thereof with the top side-tubes 21 is connected to the bottom branch tube 263. An end of the transverse branch tube 262 that is opposite to the connection thereof with the down tube sections 211 of the top side-tubes 21 is connected to the bottom branch tube 263. The front bracket 26 is provided with a liquid heat dissipator assembly 6 for supply of a coolant liquid that dissipates heat from the power unit 5.

Figure 3:
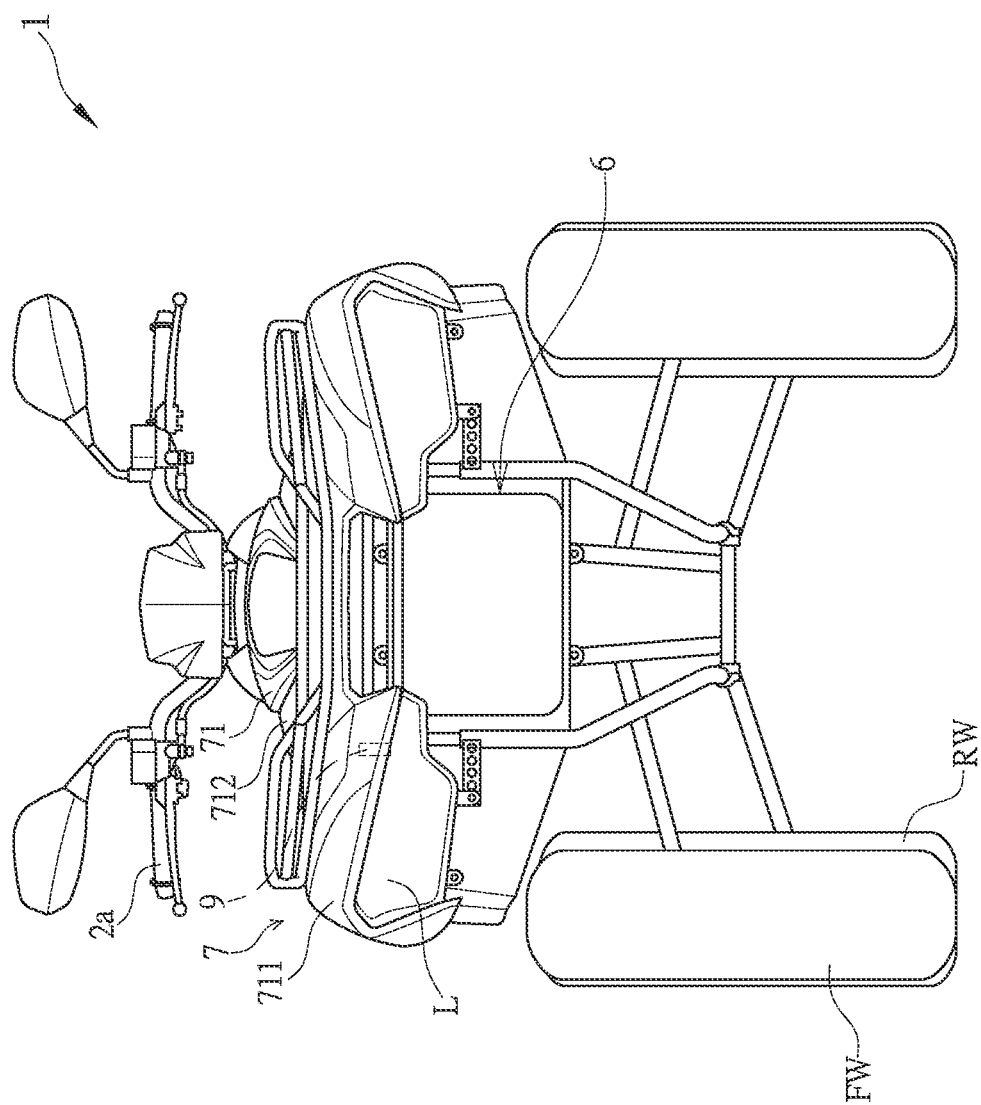
FIG. 3 is a front view showing the all-terrain vehicle according to the present invention.
Figure 4:
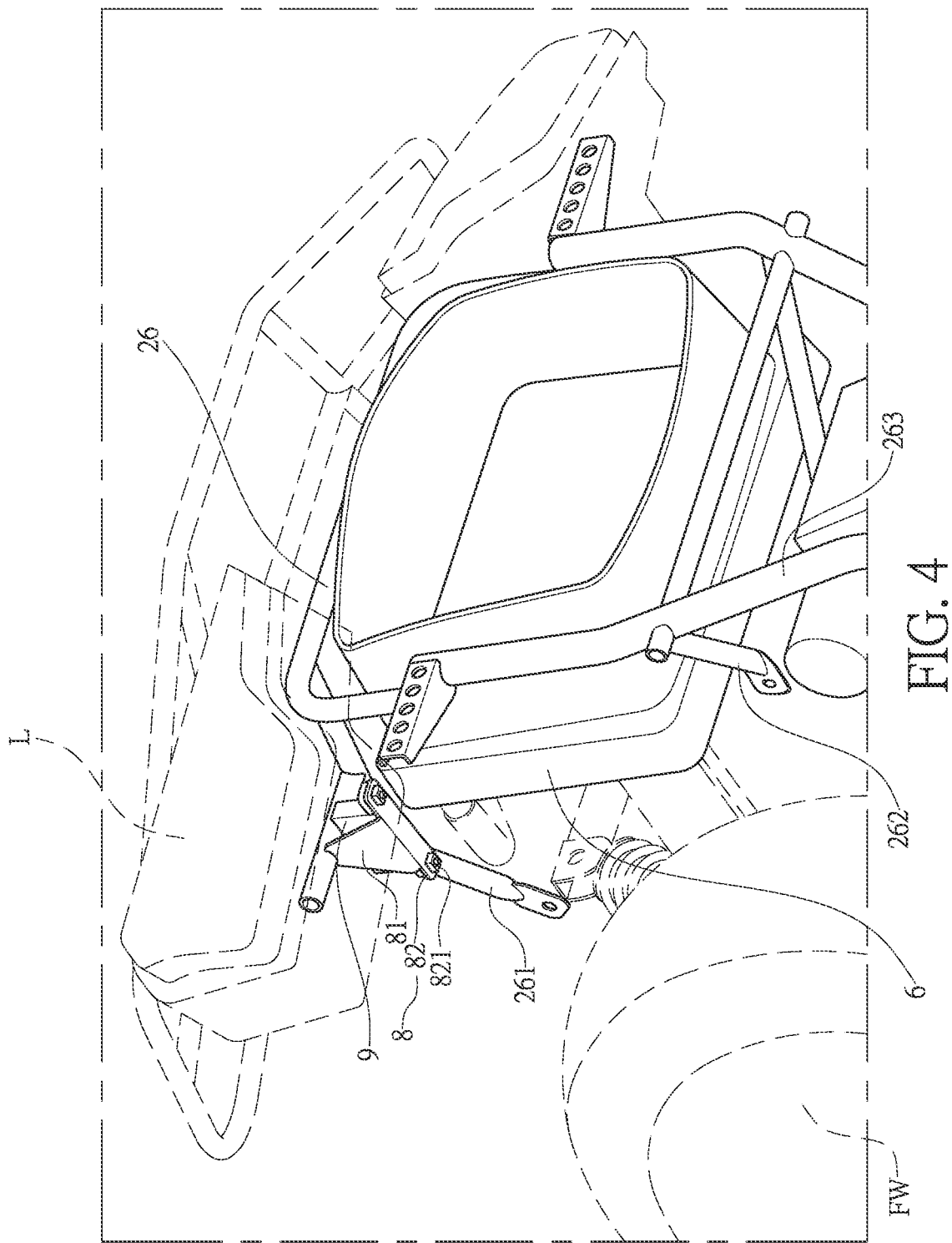
FIG. 4 is a schematic view showing an example of arrangement of an inertial sensor in the all-terrain vehicle according to the present invention.

As shown in FIGS. 1, 3, and 4, the vehicle frame unit 2 is covered, on a periphery thereof, by a vehicle cover unit 7. The vehicle cover unit 7 comprises a front vehicle cover section 71 that covers the vehicle body front part of the all-terrain vehicle 1. Extended from the front vehicle cover section 71 toward two sides, the left side and the right side, of the vehicle body are front fender sections 711, and the front fender section 711 are arranged above the group of front wheels FW that are arranged as a left-side one and a right-side one. Provided on a front side of the front vehicle cover section 71 are head lights L that are arranged pairwise as a left-side one and a right-side one. The front vehicle cover section 71 comprises an upper vehicle cover section 712 at an upper front side of the vehicle body. The vehicle cover unit 7 comprises lateral vehicle cover sections 72, which are arranged toward the vehicle body rear side from the front vehicle cover section 71 and located at rear lower sides of the upper vehicle cover sections 712 and a lower side of the seat cushion 4. The lateral vehicle cover sections 72 cover side parts of the vehicle body of the all-terrain vehicle 1 at two lateral sides. The vehicle cover unit 7 is provided with rear vehicle cover sections 73, which are toward vehicle body rear side from the lateral vehicle cover sections 72, and the rear vehicle cover sections 73 cover the rear side part of the vehicle body of the all-terrain vehicle 1. The rear vehicle cover sections 73 are extended toward two sides of the vehicle body to form rear fender sections 731, and the rear fender sections 731 are located above the rear wheels RW.

As shown in FIGS. 2, 3, and 4, a mounting board 8 is mounted to the top branch tubes 261 of the front bracket 26 in a direction toward the liquid heat dissipator assembly 6, by means of welding or screwing. The mounting board 8 is generally an L-shaped plate that comprises a vertical section 81 extended toward the lower side of the vehicle body and a mounting section 82 bent from the vertical section 81 to extend toward a center of the vehicle body. The mounting section 82 is formed, at least, with a mounting hole 821, and in an embodiment of the present invention, two such mounting holes 821 are included. The mounting board 8 is fixed to the top branch tubes 261 of the front bracket 26 so as to be located below the front fender sections 711 of the front vehicle cover section 71 and at the upper rear side of the liquid heat dissipator assembly 6. In the drawings, the front fender section 711 at the right side is taken as an example for illustration.

As shown in FIGS. 2, 3, and 4, an inertial sensor 9 is mounted to the mounting section 82 of the mounting board 8, and more specifically, the inertial sensor 9 is mounted to the two mounting holes 821. The inertial sensor 9 is in information connection with a controller (not shown in the drawings) of the anti-lock braking system (ABS). The inertial sensor 9 transmits data, such as tilt angle and angular momentum, which are detected during driving operation of the all-terrain vehicle 1 to the controller of the anti-lock braking system (ABS), so as to allow the controller of the anti-lock braking system (ABS) to make the all-terrain vehicle 1 perform an operation condition of bettered safety and security. The inertial sensor 9, after being mounted to the mounting section 82 of the mounting board 8, is located in a space that is above the front wheel FW and below the front vehicle cover section 71. Specifically, the space between a top side of the front wheel FW and the front vehicle cover section 71 forms an open receiving space A, and the inertial sensor 9 is disposed in the open receiving space A. The open receiving space A is opened and thus free of obstacles toward a vehicle body width direction, so as to ease engineering of mounting and service of the inertial sensor 9. After the inertial sensor 9 is mounted in the open receiving space A, the inertial sensor 9 is set away from the ground surface and when viewed from a lateral side, the inertial sensor 9 is located at the rear side of the head light L and at one side of the upper side of the liquid heat dissipator assembly 6, and specifically, as being observed from the front side, the inertial sensor 9 is located above the head light L and at one side of the upper side of the liquid heat dissipator assembly 6, meaning the liquid heat dissipator assembly 6 is located at a lower side of the front vehicle cover section 71 and an upper side of the front wheels FW toward one side of the liquid heat dissipator assembly 6, so that an upper side of the inertial sensor 9 is covered by the front vehicle cover section 71, and consequently, dust and moisture coming from the top side can be blocked by the front vehicle cover section 71, while dust and moisture coming from the ground can be blocked by the liquid heat dissipator assembly 6, meaning dust and moisture that are driven up from the ground by the front wheel FW are prevented from splashing toward the inertial sensor 9, and dust and moisture from the front side of the vehicle body are blocked by the head light L and the liquid heat dissipator assembly 6, so as to protect the inertial sensor 9 from corrosion by the external dust and moisture and thus ensure the service life of the inertial sensor 9.

The first efficacy of the present invention is that the all-terrain vehicle 1 at least comprises a vehicle frame unit 2, and a steering mechanism 2a is rotatably mounted to a front side of the vehicle frame unit 2 and front wheels FW are rotatably mounted to a lower side of the steering mechanism 2a and are controllable by the steering mechanism 2a; the all terrain vehicle 1 further comprises a vehicle cover unit 7 covering a periphery of the vehicle frame unit 2, wherein the vehicle cover unit 7 at least comprises a front vehicle cover section 71 and an open receiving space A is formed between a top side of the front wheels FW and the front vehicle cover section 71, and an inertial sensor 9 is arranged in the open receiving space A; and as such, for engineering of mounting and servicing the inertial sensor 9, the engineering of mounting and servicing can be carried out without removing the front vehicle cover section 71 or other parts, and thus the engineering of mounting and servicing of the inertial sensor 9 is made easy.

The second efficacy of the present invention is that head lights L are provided on a front side of the front vehicle cover section 71 as being pairwise arranged as a left-side one and a right-side one, and the inertial sensor 9 is located rearward of the head lights L and below the front vehicle cover section 71 and above the front wheels FW; and as such, the inertial sensor 9 is kept away from the ground for protection from corrosion caused by external dust and moisture so as to ensure the service life of the inertial sensor 9.

The third efficacy of the present invention is that the vehicle frame unit 2 comprises a front bracket 26 mounted to a front side of the vehicle body; the front bracket 26 is provided with a liquid heat dissipator assembly 6; and when viewed from a lateral side, the inertial sensor 9 is located at an upper side of the liquid heat dissipator assembly 6; and as such, the inertial sensor 9 is kept away from the ground for protection from corrosion caused by external dust and moisture so as to ensure the service life of the inertial sensor 9.

The fourth efficacy of the present invention is that the front bracket 26 comprises a top branch tube 261, a transverse branch tube 262, and a bottom branch tube 263; the top branch tube 261 is provided with a mounting board 8 that is mounted thereto by fastening or welding, and the inertial sensor 9 is mounted to the mounting board 8; and as such, engineering of mounting and servicing of the inertial sensor 9 is made easy.

The fifth efficacy of the present invention is that the mounting hoard 8 comprises a vertical section 81 and a mounting section 82 bent from the vertical section 81 to extend toward a center of the vehicle body, and the inertial sensor 9 is mounted to the mounting section 82; and as such, engineering of mounting and servicing of the inertial sensor 9 is made easy.

The sixth efficacy of the present invention is that the mounting section 82 is formed with two mounting holes 821, and the inertial sensor 9 is mounted to the two mounting holes 821; and as such, engineering of mounting and servicing of the inertial sensor 9 is made easy.

The seventh efficacy of the present invention is that head lights L are provided on a front side of the front vehicle cover section 71 as being pairwise arranged as a left-side one and a right-side one; when observed from a front side, the inertial sensor 9 is located above the head lights L and at one side of an upper side of the liquid heat dissipator assembly 6; and as such, the inertial sensor 9 is kept away from the ground for protection from corrosion caused by external dust and moisture so as to ensure the service life of the inertial sensor 9.

In summary, the above-described structure of the present invention could improve the shortcomings of the prior art and achieve the desired purpose, and shows apparent improvement in respect of performance over the prior art and thus completely complies with the requirements for novelty, utilization, and inventiveness, and an application for patent is thus filed for pursuing grating of patent.

We claim:

1. An all-terrain vehicle, wherein the all-terrain vehicle at least comprises a vehicle frame unit, a steering mechanism being rotatably mounted to a front side of the vehicle frame unit, front wheels being rotatably mounted to a lower side of the steering mechanism as being arranged as a left-side one and a right-side one and controllable by the steering mechanism; the all-terrain vehicle further comprises a vehicle cover unit covering a periphery of the vehicle frame unit, the vehicle cover unit at least comprising a front vehicle cover section, and is characterized in that an open receiving space is formed between a top side of the front wheels and the front vehicle cover section, and an inertial sensor is arranged in the open receiving space, wherein the vehicle frame unit comprises a front bracket mounted to a front side of a vehicle body; the front bracket is provided with a liquid heat dissipator assembly; and when viewed from a lateral side, the inertial sensor is located at an upper side of the liquid heat dissipator assembly.

2. The all-terrain vehicle according to claim 1, wherein head lights are provided on a front side of the front vehicle cover section as being pairwise arranged as a left-side one and a right-side one; and the inertial sensor is located rearward of the head lights and below the front vehicle cover section and above the front wheels.

3. The all-terrain vehicle according to claim 1, wherein the front bracket comprises a top branch tube, a transverse branch tube, a bottom branch tube; a mounting board is mounted to the top branch tube by fastening or welding, and the inertial sensor is mounted to the mounting board.

4. The all-terrain vehicle according to claim 3, wherein the mounting board comprises a vertical section and a mounting section bent from the vertical section to extend toward a center of the vehicle body, and the inertial sensor is mounted to the mounting section.

5. The all-terrain vehicle according to claim 4, wherein the mounting section is formed with two mounting holes, and the inertial sensor is mounted to the two mounting holes.

6. The all-terrain vehicle according to claim 1, wherein head lights are provided on a front side of the front vehicle cover section as being pairwise arranged as a left-side one and a right-side one; when observed from a front side, the inertial sensor is located above the head lights and at one side of an upper side of the liquid heat dissipator assembly.

* * * * *